July 1, 1930.   F. D. HOLDSWORTH   1,768,846

VALVE MECHANISM

Original Filed Dec. 31, 1923

Inventor:
Fred D. Holdsworth.
by
atty.

Patented July 1, 1930

1,768,846

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE MECHANISM

Application filed December 31, 1923, Serial No. 683,611. Renewed September 9, 1929.

This invention relates to valve mechanisms.

It has for its general object to provide an improved type of valve mechanism. A further and more specific object is to provide an improved arrangement of the various elements so that the valves may be held in position by exterior means. Another object is to provide an improved valve retaining structure which will be exceedingly compact and allow ready removal of the various elements. Other objects will be apparent from the following description and claims.

In the accompanying drawings I have shown for purposes of illustration one form which my invention may assume in practice.

In these drawings,—

Figure 1:
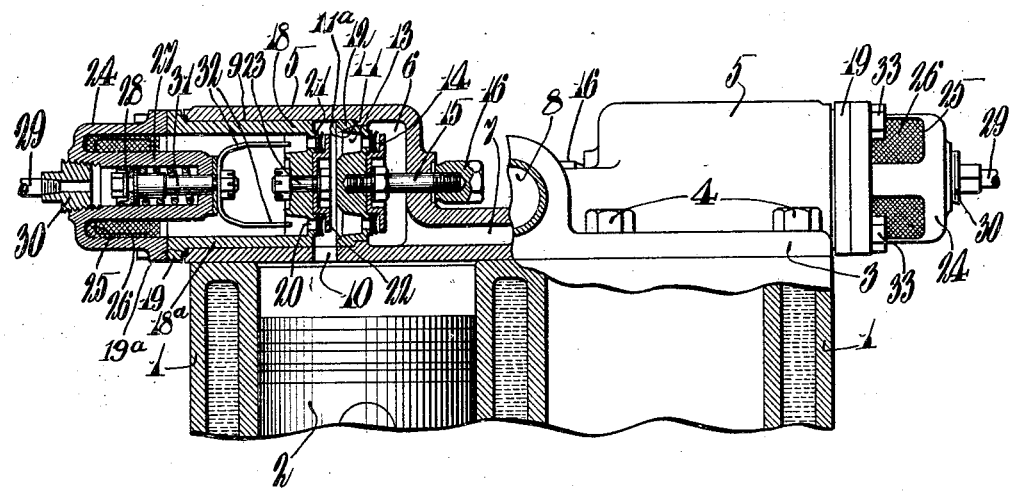
Fig. 1 is a partial vertical longitudinal section through the valve mechanism and cylinders.
Figure 2:
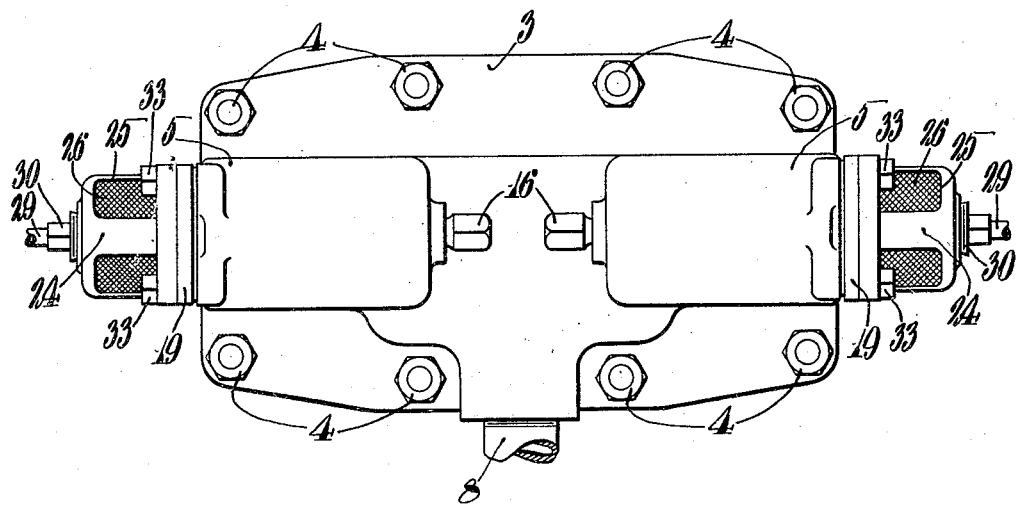
Fig. 2 is a plan view.

My improved type of valve mechanism is shown for purposes of illustration as mounted upon compressor cylinders 1 having usual reciprocatory pistons 2 therein, and comprises a unitary structure adapted to close the upper end of both cylinders. The valve structure comprises a head 3 adapted to be held in position upon the cylinder by bolts 4 or other suitable means and having upwardly extending valve supporting portions 5 at opposite ends of the head 3 with their longitudinal axes substantially in alinement. As each portion 5 contains inlet and discharge valve mechanisms and both sets of mechanisms are identical, only one set will be described. The inner ends of the members 5 have chambers 6 communicating with each other as by a passage 7 which has outlet means 8. Disposed adjacent one end of the chamber 6 is a bore 9 within which part of the valve mechanism is disposed and which has communication with the cylinder 1 as by a port 10. Disposed intermediate the chamber 6 and the bore 9 is a flange 11 adapted at $11^a$ to provide a seat for a discharge valve cage 12 which has usual discharge ports 13 covered by a valve 14. The cage and valve are held in position by a bolt 15 which projects through the upwardly extending portion of the member 5 and is secured thereto as by a nut 16. By releasing the nut 16, the cage 12 can be slid directly out of the member 5 through bore 9. Disposed within the bore 9 is an inlet valve mechanism 18 mounted upon the inner end of a sleeve $18^a$ which has a flange 19 adapted to seat at $19^a$ against the end of the member 5. This valve has inlet ports 20 adapted to be opened and closed by a valve 21 similar to valve 14 and held in position by a guiding member 22 fixed to the valve cage by a bolt 23.

Suitable means are provided for unloading the compressor, as by holding the inlet valve open, and comprise a cylindrical casing 24 having inlet ports 25 in the periphery thereof covered by a screen 26. Projecting inwardly from the outer end of the member 24 is a cylinder 27 having reciprocably mounted therein a spring pressed piston 28. The cylinder 27 has communication with an air supply as by a pipe 29 threaded into an end closure plug 30. The piston 28 has a rod 31 projecting into the casing 24 and carries on its inner end, valve engaging fingers 32. The unloading valve mechanism is held to the member 5 by bolts 33.

In the operation of my device the fluid will flow into the compressor as through ports 25, 20 and inlet passage 10 and upon the compression stroke will be forced outwardly past the valve 14 and into the common passage 7, from which it will be led to a receiver as by the pipe 8. When it is desired to unload, pressure fluid is admitted to actuate pistons 28, thereby thrusting fingers 32 forwardly to hold the inlet valves open.

It will be seen that by my improved construction I can readily remove the inlet and exhaust valve by the removal of relatively few members such as the nuts 16 and bolts 33 without necessitating the removal of any other members such as the cylinder heads as is usually done. Also the device may be manufactured at an exceedingly small cost due to the fact that the seats 19ª and 11ª for the valve cages on the member 5 can be machined or bored from the same end. It is also to be noted that by placing these valve cages in longitudinal alinement there can be no portions projecting over the side of the cylinder, thus causing unnecessary additional width to be taken into consideration when the compressor is placed in a particularly crowded position such as in portable compressors. My construction also allows the two valve casings to be placed exceedingly close together but at the same time permits the valves to be readily removed without any inconvenience whatsoever, this being due to the exterior holding means and the removal of the valves from one end of the chamber.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. A head and valve mechanism for a compressor having a plurality of compressing cylinders comprising a head adapted to cover the ends of a plurality of cylinders, said head including projecting valve casings, said valve casings being spaced, arranged in alinement, and each having a discharge chamber, and said head being formed with a passage connecting said chambers to a common outlet.

2. A head and valve mechanism for a compressor having a plurality of compressing cylinders comprising a head adapted to cover the ends of a plurality of cylinders, said head including a pair of projecting valve casings, said valve casings being spaced, each formed with a longitudinal bore, and arranged with the bores in alinement, and valve mechanisms disposed in said bores and removable from each bore by movement away from the other casing.

3. A head and valve mechanism for a compressor having a plurality of compressing cylinders comprising a head adapted to cover the ends of a plurality of cylinders, said head including a pair of projecting valve casings, said valve casings being spaced, each formed with a longitudinal bore, and arranged with the bores in alinement, said head being formed with a passage placing the adjacent ends of said bores in communication, and valve mechanisms disposed in said bores and removable from each bore by movement away from the other casing.

4. A head and valve mechanism for a compressor comprising a head adapted to cover the end of a compressor cylinder, said head including a valve casing formed with a bore and an annular flange projecting into said bore, a discharge valve mechanism comprising a removable valve cage seated on said flange and removable through an end of said bore, said cage being disposed in a plane parallel to the axis of the compressor cylinder, and an inlet valve mechanism disposed in said bore substantially parallel to said discharge valve mechanism, said inlet valve mechanism being removable through the same end of said bore as said discharge valve mechanism and prior thereto.

5. A head and valve mechanism for a compressor having a plurality of compressing cylinders comprising a head adapted to cover the ends of a pair of cylinders, said head including a pair of valve casings each formed with a bore and an annular flange projecting into said bore, a pair of discharge valve mechanisms, each comprising a removable valve cage seated on one of said flanges and removable through an end of its respective bore, each cage being disposed in a plane parallel to the axis of the respective compressor cylinder, and an inlet valve mechanism disposed in each bore substantially parallel to the corresponding discharge valve mechanism, each inlet valve mechanism being removable through the same end of its respective bore as the corresponding discharge valve mechanism and prior thereto, said head having a passage connecting the remaining end of each bore to a common discharge outlet.

6. In combination, a casing having a bore with an open end, valve mechanism disposed in said bore and removable through said open end, and unloading mechanism for said valve comprising a supporting portion, said unloading mechanism being arranged to extend into said bore with said supporting portion mounted at said open end, said supporting portion having ports therein for allowing fluid flow to said valve mechanism through said open end.

7. In combination, a casing having an opening communicating with a chamber, valve mechanism disposed in said chamber, and unloading mechanism for said valve mechanism mounted at said opening, said unloading mechanism comprising actuating means and a frame having inner and outer portions, said inner portion carrying said actuating means and said outer portion being mounted on said casing and being formed with ports for allowing fluid flow to said valve mechanism through said opening.

8. In combination, a casing having a bore with an open end, said bore being formed with a shoulder therein intermediate the ends thereof, a valve mechanism disposed against said shoulder, said bore being of sufficient diameter from its open end inwardly to said shoulder to admit said valve mechanism, and holding means projecting longitudinally of said bore from the other end thereof to draw the valve mechanism against said shoulder.

9. A valve mechanism comprising a casing having a uniform bore, valve mechanism disposed therein comprising inlet and discharge valve cages of substantially the same outer diameter, and means for supporting said cages against movement longitudinally of said bore.

10. A head and valve mechanism for a compressor having a plurality of compressing cylinders comprising a head adapted to cover the ends of a plurality of cylinders, said head including projecting valve casings each having a valve chamber, said valve chambers being connected by a passage, valve mechanisms disposed in spaced relation in each of said chambers, and means for holding said valve mechanisms in said valve chambers, said holding means being adapted to be operated from the exterior of said casings to fix the same in position.

11. A head and valve mechanism for a compressor having a plurality of compressing cylinders comprising a head adapted to cover the ends of a plurality of cylinders, said head including projecting valve casings each having a valve chamber, and the adjacent ends of said valve chambers being connected by a passage to a common outlet.

12. A head and valve mechanism for a compressor having a plurality of compressing cylinders comprising a head adapted to cover the ends of a plurality of cylinders, said head including projecting valve casings each having a valve chamber formed as a bore, said chambers being in alinement and connected by a passage, a plurality of valve mechanisms disposed in each bore, and holding means passing through the adjacent ends of said casings, each holding means engaging a valve mechanism to hold the same in position.

13. In combination, a casing having a bore open at one end, a plurality of separate valve cages seated in said bore intermediate its ends, one of said cages comprising a ported valve seat carried by a sleeve slidably fitted within said bore, the flow of air to the corresponding valve ports being through said sleeve, unloading mechanism mounted at the open end of said bore with a portion of said mechanism projecting therein, and means for holding said cages and unloading mechanism in position.

14. In combination, a casing having a bore open at one end, a plurality of separate valve cages seated in said bore intermediate its ends and removable only through the open end thereof, one of said cages comprising a sleeve slidably fitted within said bore, unloading mechanism mounted at the open end of said bore with a portion of said mechanism projecting therein, and means for holding said cages and unloading mechanism in position.

15. The combination with a plurality of adjacent cylinders, of a head covering the ends thereof, said head having spaced valve casings disposed thereon provided with bores in longitudinal alinement.

16. A valve mechanism comprising a casing disposable on a cylinder end and having walls defining a valve chamber extending transversely of the cylinder, one of said walls being interposed between the cylinder and said valve chamber, said chamber being open at one end and having a transverse wall at the other end, inlet and discharge valve cages disposed in said chamber, said discharge valve cage being adjacent said end wall, means for holding said valve cages from opposite ends of said casing, said holding means being adapted to be operated from the exterior of said casing to fix the same in position, and a discharge passage leading from said chamber at a point substantially adjacent certain of said holding means.

17. In combination, a casing having a chamber and a bore within an open end, said casing having a transverse wall defining one end of said chamber, valve mechanism comprising a discharge valve disposed between said bore and chamber, and means extending through said transverse wall for holding said discharge valve in place, said casing providing a discharge passage communicating with said chamber and extending in a general direction parallel to the longitudinal axis of said bore.

18. In combination, a casing having a chamber and a bore, said casing having a transverse wall defining one end of said chamber, valve mechanism comprising a discharge valve disposed between said bore and chamber, and means projecting through said transverse wall for holding said discharge valve in place, said casing providing a discharge passage leading from said chamber substantially parallel to the longitudinal axis of said holding means.

19. In combination, a casing having a chamber and a bore, said casing having a transverse wall defining one end of said chamber, valve mechanism comprising a discharge valve disposed between said bore and chamber, and means projecting through said transverse wall for holding said discharge valve in place, said casing providing below said holding means a discharge passage leading from said chamber substantially parallel to the longitudinal axis of said holding means.

20. In combination, a cylinder head including a valve casing having a bore with an open end, a valve mechanism insertible in said bore through its open end, unloading mechanism for said valve mechanism disposed in said casing at the open end of said bore, and means for supporting said unloading mechanism yet permitting flow of fluid to said valve mechanism through said open end and from a point beyond said unloading mechanism.

21. In combination, a valve mechanism, a casing enclosing the same and formed with an opening, an unloading device for said valve mechanism, said device comprising an actuator, and means for supporting said unloading device to project through said opening so as to be adapted to cooperate with said valve mechanism, said supporting means being formed with passages on opposite sides of said device to permit fluid to flow through said opening to said valve mechanism.

22. In combination, a casing having a bore, a sleeve inserted in said bore, and a complete valve unit carried at the end of said sleeve received within said bore, said valve unit including a seat, a guard, and a movable valve element, and said sleeve having imperforate lateral walls and an open outer end to permit fluid flow therethrough.

23. In combination, a casing having a bore, a sleeve inserted in said bore, a complete valve unit carried at the end of said sleeve received within said bore, and means for holding said sleeve in fixed relation to said casing with said valve unit within said bore including surfaces pressed together all of which lie outside said bore and at the exterior of said casing.

24. In combination, a casing having an exterior abutment surface and, opening through the latter, a bore, a sleeve inserted in said bore, a complete valve unit carried at the end of said sleeve received within said bore, and means for holding said sleeve in fixed relation to said casing with said valve unit within said bore including a flange on said sleeve outside said bore and adapted to engage said exterior abutment surface.

25. A compressor comprising, in combination, a cylinder, a piston reciprocable therein, a cylinder head having inlet and discharge passages, separately mounted inlet and discharge plate valve mechanisms cooperating with said passages, said mechanisms including coaxial valve cages disposed parallel to the cylinder axis, and unloading mechanism coaxial with said valve cages.

26. In combination, a casing having a bore, a sleeve inserted for at least a portion of its length within said bore, a complete valve unit carried at the end of said sleeve received within said bore, said valve unit including a seat, a guard, and a movable valve element, and means outside said bore and at the exterior of said casing for limiting the extent of entry of said sleeve into said bore and holding it in position therein, said sleeve being precluded from further entry only by said exterior means.

27. In combination, a casing having a bore and outside said bore and on the exterior of said casing an abutment surface, valve mechanism including a valve seat, a guard, and a movable valve element disposed in said bore, supporting means for said valve mechanism having an abutment portion in rigid spaced relation to said valve seat, and means for clamping said abutment portion against said abutment surface.

In testimony whereof I affix my signature.
FRED D. HOLDSWORTH.

CERTIFICATE OF CORRECTION.

Patent No. 1,768,846.  Granted July 1, 1930, to

FRED D. HOLDSWORTH.

It is hereby certified that error appears in the printed specification of the above numbered patent requiring correction as follows: Page 3, line 93, claim 17, for the word "within" read with; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.